Feb. 1, 1966   E. K. HANSEN   3,232,380
FORK AND CARRIAGE ASSEMBLY FOR LIFT VEHICLES
Filed Nov. 22, 1963   2 Sheets-Sheet 1
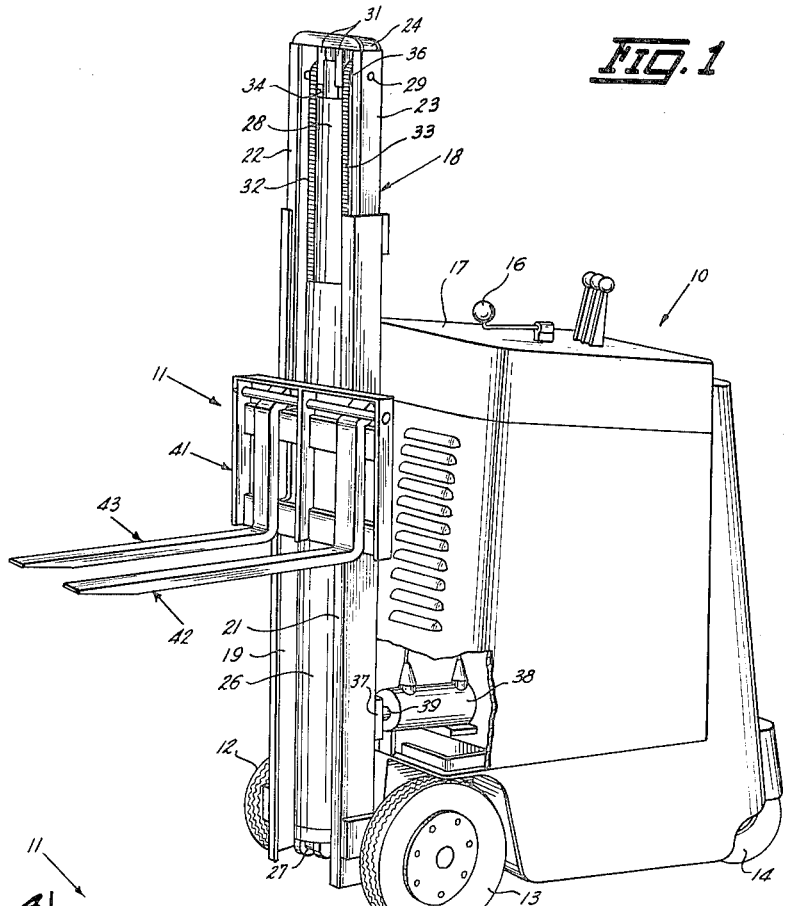
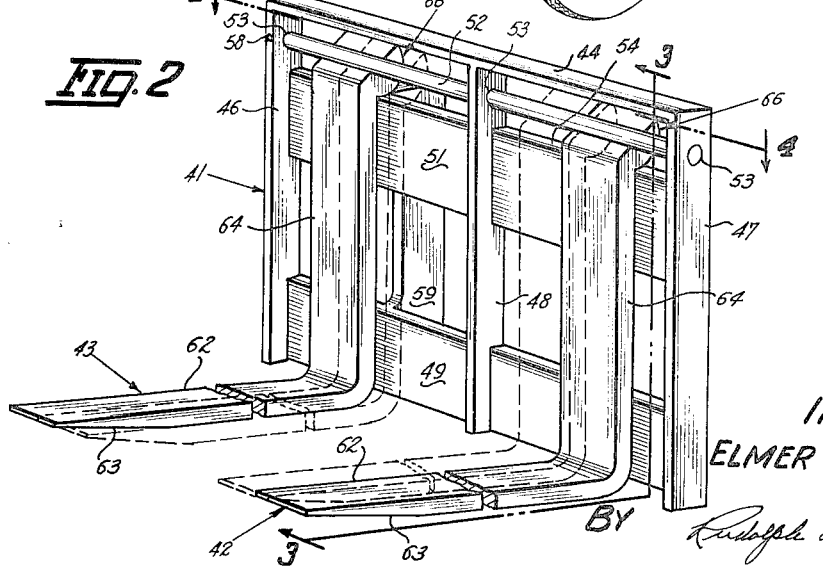
INVENTOR.
ELMER K. HANSEN
BY Rudolph L. Lowell
ATTORNEY.

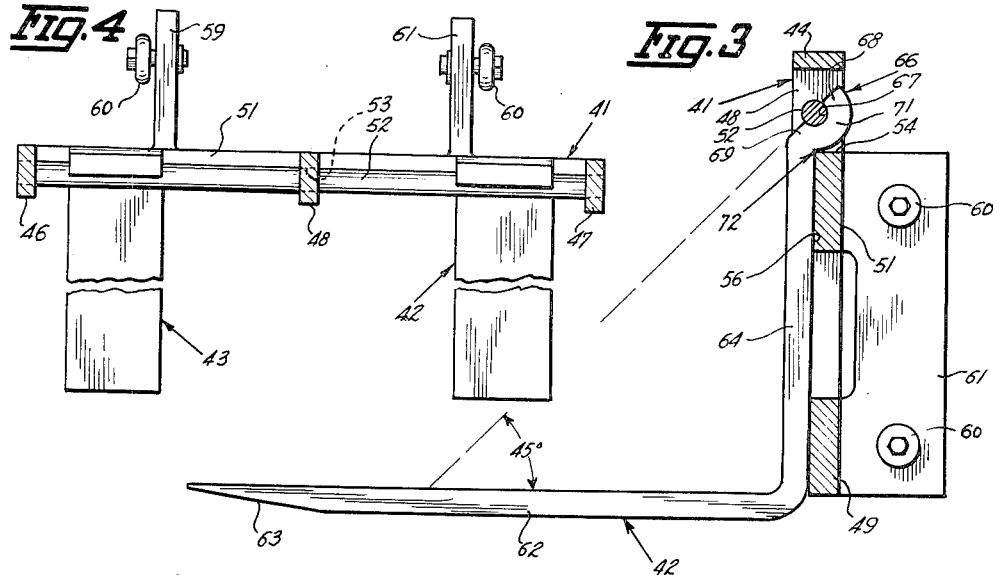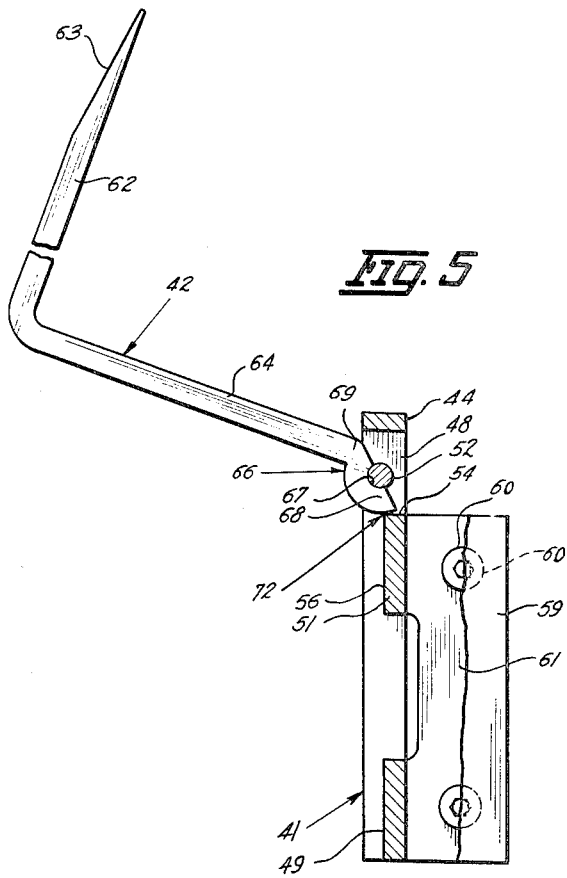

United States Patent Office 3,232,380
Patented Feb. 1, 1966

3,232,380
FORK AND CARRIAGE ASSEMBLY FOR
LIFT VEHICLES
Elmer K. Hansen, 126 Cecilia, Sioux City, Iowa
Filed Nov. 22, 1963, Ser. No. 325,586
6 Claims. (Cl. 187—9)

This invention relates to an article handling vehicle and more particularly to a fork and carriage assembly for an article lift truck.

It is the object of this invention to provide an improved fork and carriage assembly usable with an article lift truck.

Another object of the invention is to provide a fork and carriage assembly with forks that may be readily coupled to and uncoupled from the elevatable carriage without dismantling the carriage and without the use of tools.

A further object of the invention is to provide an elevatable carriage of a lift truck with a plurality of forwardly projected forks which are laterally adjustable to accommodate loads of varying widths.

An additional object of the invention is to provide a fork and carriage assembly for a lift truck which is strong in construction, economical to manufacture, and efficient and reliable in use.

The exact nature of the invention as well as other objects and advantages thereof will be readily apparent from the consideration of the following specification relating to the accompanying drawing, in which:

FIG. 1 is a perspective view of an article lift truck equipped with the carriage and fork assembly of this invention;

FIG. 2 is an enlarged perspective view of the carriage and fork assembly shown in FIG. 1;

FIG. 3 is an enlarged sectional view taken along the line 3—3 of FIG. 2 illustrating the fork in assembled relation with the carriage;

FIG. 4 is an enlarged sectional view taken along the line 4—4 of FIG. 2; and

FIG. 5 is a sectional view similar to FIG. 3 showing the initial position of the fork in the assembly of the fork on the carriage.

Referring to the drawing, there is shown in FIG. 1 a motor vehicle 10 in the form of an article lift truck equipped with a fork and carriage assembly 11 of this invention. The truck 10 has a motor (not shown) which drives a pair of front wheels 12 and 13. A steering caster wheel 14 is rotatably mounted on the rear section of the frame of the truck. A steering arm 16 is mounted on the truck control panel 17 and is mechanically coupled to the steering caster wheel 14. The operator of the truck angularly moves the steering arm 16 to control the direction of travel of the truck.

Extended in an upward direction from the drive wheels 12 and 13 is a mast 18 comprising a pair of outer channel beams 19 and 21 and a pair of inner channel beams 22 and 23 telescoped within the beams 19 and 21. The lower ends of the outer channel beams 19 and 21 are pivotally mounted on the vehicle frame adjacent the drive wheels 12 and 13. A cross member 24 connects the upper end of the inner channel beams 22 and 23.

The inner beams 22 and 23 are vertically moved relative to the outer means 19 and 21 by an upright cylinder assembly 26, the lower end of which is positioned between the drive wheels 12 and 13 and mounted on the truck frame by a pivotal connection 27. A piston 28 projected from the upper end of the cylinder assembly 26 is connected to a transverse shaft 29 rotatably mounted in a pair of downwardly extended legs 31 secured to the cross member 24.

The fork and carriage assembly 11 for the mast 18 is supported by a pair of roller link lift chains 32 and 33. Each chain has one of its ends secured to the fork and carriage assembly 11 and from such ends the chains 32 and 33 are trained over sprockets 34 and 36 rotatably mounted on the shaft 29 for connection of their opposite ends to a transverse member 37 secured to the lower sections of the outer channel beams 19 and 21.

When hydraulic fluid under pressure is supplied to the head end of the cylinder assembly 26, the piston 28 is moved in an upward direction carrying the inner beams 22 and 23 to an elevated position. The fork and carriage assembly 11 is simultaneously elevated by the action of the lift chains 32 and 33 which roll over their respective sprockets 34 and 36. When the fluid pressure in the cylinder assembly 26 is released and the hydraulic fluid in the cylinder assembly allowed to return to a reservoir (not shown) the piston 28 will move in a downward direction under the weight of the inner channel beams 22 and 23 and the weight of the fork and carriage assembly 11. Movement of the piston 28 in a downward direction results in the lowering of the fork and carriage assembly 11.

The mast 18 is maintained in an upright position and tilted about the axis of the drive wheels 12 and 13 by a double acting fluid cylinder or motor 38 mounted on the truck frame behind the outer channel beams 19 and 21. The fluid motor 38 is a piston and cylinder assembly which includes a piston rod 39 pivotally connected to the transverse member 37.

As shown in FIG. 1, the fork and carriage assembly 11 is positioned adjacent the forward side of the mast 18 and comprises a carriage 41 carrying a pair of forks 42 and 43. The carriage 41 (FIG. 2) comprises a top transverse member 44 the opposite ends of which are secured to downwardly projected legs 46 and 47. A third or intermediate leg 48 is secured to the center portion of the transverse member 44 and extends downwardly therefrom substantially parallel to the legs 46 and 47. The bottom portions of the legs 46, 47 and 48 are connected with an upright plate 49 which is secured to each of the legs. A second upright plate 51 is positioned below the transverse member 44 and extends substantially parallel thereto with its opposite ends secured to the legs 46 and 47 and its mid-section secured to the third leg 48.

A circular rod 52, projected through aligned holes 53 in the upper section of the legs 46, 47 and 48, is spaced above the top surface 54 of the plate 51 in substantially parallel alignment therewith. The plane of the forward surface 56 of the plate 51 projects diametrically through the rod 52 (FIG. 3). As shown in FIG. 2, the rod 52 is maintained in an assembled position with respect to the legs 46, 47 and 48 by a set screw 58 threaded into the leg 46 and engageable with the rod 52.

Secured to the back surfaces of the plates 49 and 51 are a pair of upright arms 59 and 61. Carried on each of the arms 59 and 61 are pairs of rollers 60. When the carriage 41 is positioned in assembled relation with the mast 18 the arms 59 and 61 are positioned adjacent the inside surfaces of the inner channel beams 22 and 23 with the rollers 60 engaging the flanges of the respective inner channel beams.

The forks 42 and 43 are identical in construction. The number of forks carried by the carriage 41 may be increased or decreased in accordance with the requirements of the load to be carried by the truck. The following description is limited to the details of the fork 42.

As shown in FIG. 3, the fork 42 comprises a forwardly extended finger section 62 which has an upwardly inclined forward bottom wall 63. The finger section 62 is positioned in a substantially horizontal plane which is immediately below the carriage 41. Integral with the rear portion of the finger section 62 is an upright back section 64 which is in engagement with the forward surfaces of the plates 49 and 51. The back section 64 extends in a plane which is substantially normal to the horizontal plane of the finger section 62.

Integrally joined with the top end of the back section 64 is a semicircular connecting member 66 (FIG. 3) having a transverse semicircular groove 67 defined by a pair of legs 68 and 69 joined by a curved base 71. The legs 68 and 69 and the base 71 have a thickness substantially equal to the transverse distance of the slot between the rod 52 and the top surface 54 of the plate 51. The upper end portion of the back section 64 is secured to the leg 69 so as to position the groove 67 under the rod 52. A portion of the periphery of the base 71 adjacent the leg 69 engages the top surface 54 of the upright plate 51 to hold the semicircular member 66 in engagement with the rod 52. The end planar surfaces of the legs 68 and 69 are positioned in a plane common to a diameter of the rod 52 and extended in an upward and rearward direction intersecting the plane of the finger section 62 at an angle of about 45 degrees (FIG. 3).

As shown in FIG. 3, the plate 51 functions as a fulcrum relative to the junction of the back section 64 with the circular member 66. The weight of the fork 42 produces an upward and forward force on the rod 52 as it rotates about the rod 52 in resting engagement on the fulcrum edge 72 of the plate 51.

Referring to FIG. 2, the forks 42 and 43 are laterally adjustable to different spaced positions to handle loads of varying widths as indicated by the broken lines. The semicircular member 66 of each of the forks is slidable axially of the rod 52 between the limits defined by the legs 46, 47 and 48.

As shown in FIG. 5, the fork 42 may be uncoupled from the carriage without dismantling either the fork or the carriage and without the use of tools. In order to uncouple the fork 42 the finger section 62 is raised from its position in FIG. 3 to its upright position in FIG. 5 by rotation of the semicircular member 66 about the axis of the rod 52. When the semicircular member 66 has been rotated to its position in FIG. 5 the leg 68 is in a clearance relationship with the top surface 54 of the upright plate 51 whereby the entire fork 42 may be moved forwardly in a horizontal direction for separation from the carriage 41.

To couple the fork 42 with the carriage 41 the fork is initially placed in an elevated position as shown in FIG. 5 with the groove 67 of the semicircular member 66 facing in a rearward direction. The fork 42 is moved horizontally in a rearward direction until the rod 52 is seated in the groove 67, after which rotation of the fork 42 in a downward direction about the axis of the rod 52 moves the back section 64 into engagement with the forward surfaces of the upright plates 49 and 51, as shown in FIG. 3.

In summary the fork and carriage assembly 11 has substantially identical forks 42 and 43 which are readily coupled to and uncoupled from an elevatable carriage 41. Included in the carriage 41 are first and second horizontal members 52 and 51 which are spaced from and extend substantially parallel to each other. Each fork has an upper end section which includes an upwardly open semicircular member 66 which is positioned about the lower portion of the first member 52 and engageable with the top portion of the second member 51 of the carriage. The forks 42 and 43 are fulcrumed on the second member and tend to move in a direction to retain the semicircular member in holding engagement with the first member 52 of the carriage. The forks 42 and 43 are uncoupled from the carriage by rotating each of the forks in an upward direction moving the semicircular member from the second member of the carriage.

Although the invention has been described with respect to its preferred embodiment, it is to be understood that it is not to be so limited since changes can be made therein which are within the full intended scope of this invention as defined by the appended claims.

I claim:

1. A fork and carriage assembly for an article lift truck comprising:
   (a) carriage means mountable on the truck and movable in upward and downward directions, said carriage means having a bottom section, and a top section including a first member having a circular-shaped cross section and a second member positioned in a spaced parallel relation below the first member, and
   (b) fork means having an upwardly open curved section positioned about a lower portion of the first member and in engagement with the top portion of the second member, a back section integral with the curved section and extended downwardly therefrom in engagement with the second member, and a finger section integral with the back section and extended forwardly from the bottom section of the carriage.

2. A fork and carriage assembly for an article lift truck comprising:
   (a) carriage means including a frame, a rod extended horizontally of the frame and a plate positioned below the rod and extended substantially parallel thereto,
   (b) a plurality of forks mounted on the carriage means, and
   (c) each fork having a finger section extended forwardly of the carriage means, a back section secured to the finger section with a portion of the back section engageable with said plate, and a semicircular section having an upwardly open groove defined by leg portions, one of said leg portions being secured to the back section, said semicircular section being engageable with the plate when the rod is seated in the groove and the back section of the fork is engageable with the plate.

3. A fork and carriage assembly for an article lift truck comprising:
   (a) carriage means including a frame, a transverse shaft extended horizontally of the frame and an upright plate member positioned in a parallel relation with the shaft, said plate having a top surface spaced below said shaft and a front surface in a plane which extends substantially through the longitudinal axis of said shaft,
   (b) a plurality of forks mounted on the carriage means,
   (c) each fork being of a substantially right angle shape having a forwardly extended finger section and an upright rear section with the rear section terminating in an upwardly and rearwardly inclined connecting member having an upper planar surface formed with a transverse semicircular groove to receive said shaft in bearing engagement therein and a lower curved surface concentric with said groove, and
   (d) said space between the shaft and said top surface forming a slot in which said connecting member is receivable when the shaft is located within said groove, whereby when said shaft is located within said groove and said rear section is extended upwardly and forwardly the connecting member is insertable within the slot and the fork pivotally movable about said shaft to a position limited by the engagement of said rear section with the front surface of said plate and in which position the junction of said curved surface with the rear section is engageable with the junction of the top and front surfaces of said upright plate.

4. A fork for an article lift truck comprising:
   (a) a finger section extended in a first plane,
   (b) a back section integrally joined at one end thereof with the finger section and projected in a second plane substantially normal to the first plane of the finger section, and
   (c) a semicircular section integral with the other end of the back section, said semicircular section having a planar surface thereof formed with a semicircular groove extended substantially parallel to the second plane, said groove being open away from said first plane and said planar surface being positioned in a third plane which intersects the finger section at an angle of about 45°.

5. A fork for an article lift truck comprising:
   (a) a finger section extended in a first plane,
   (b) a back section integrally joined at one end thereof with the finger section and projected in a second plane substantially normal from the first plane of the finger section, and
   (c) a semicircular section integral with the other end of the back section, said semicircular section having a groove extended substantially parallel to the second plane, said groove defined by a pair of legs with one of said legs being secured to the other end of the back section, said groove being open away from said first plane.

6. A fork and carriage assembly for an article lift truck comprising:
   (a) carriage means including a frame, a rod extended horizontally of the frame and a plate positioned adjacent and below said rod and extended substantially parallel thereto whereby a slot is formed between the rod and said plate,
   (b) fork means mounted on the carriage means having a finger section projected forwardly of said carriage means in a first plane, an upright back section integrally joined at the lower end thereof with the finger section and arranged in a second plane substantially normal to the first plane, and an upwardly and rearwardly inclined semicircular section at the upper end of the back section, and
   (c) said semicircular section having an upper planar surface formed with an upwardly facing transverse semicircular groove to receive said rod in bearing engagement therein and a lower surface concentric with said groove whereby on reception of the rod within the groove the semicircular section is insertable within the slot and held against vertical and lateral movement between said rod and said plate.

References Cited by the Examiner

UNITED STATES PATENTS

| | | | |
|---|---|---|---|
| 2,169,440 | 8/1939 | Weiss | 187—9 |
| 2,596,747 | 5/1952 | Ward | 214—750 |
| 3,033,400 | 5/1962 | Smith | 214—672 |

FOREIGN PATENTS

| | | |
|---|---|---|
| 1,157,352 | 11/1963 | Germany. |
| 760,808 | 11/1956 | Great Britain. |

SAMUEL F. COLEMAN, *Primary Examiner.*

ANDRES H. NIELSEN, *Examiner.*